Figure 1:
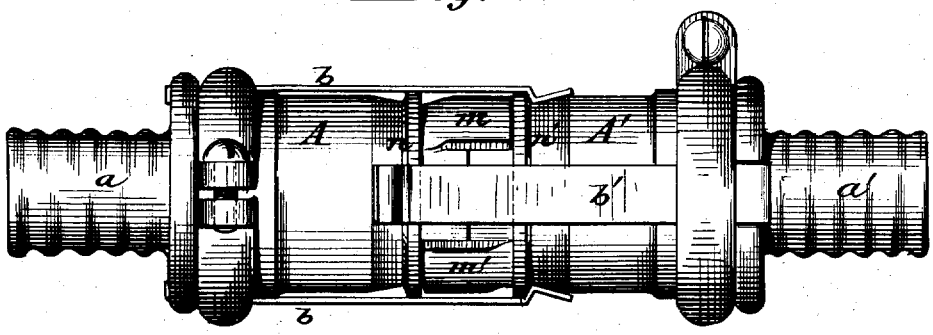

J. W. GARDNER & T. W. RANSON.

Coupling-Valve for Steam and Air-Brake.

No. 8,337. Reissued July 16, 1873.

Attest:
H. D. Perrine
J. A. Rutherford

John W. Gardner.
Thos. W. Ranson.
Inventors.
By. J. J. Coombs,
Atty.

UNITED STATES PATENT OFFICE.

JOHN W. GARDNER, OF CLEVELAND, AND THOMAS W. RANSON, OF BLACK RIVER, OHIO.

IMPROVEMENT IN COUPLING-VALVES FOR STEAM AND AIR BRAKES.

Specification forming part of Letters Patent No. 128,220, dated June 25, 1872; Reissue No. 8,337, dated July 16, 1878; application filed June 27, 1878.

*To all whom it may concern:*

Be it known that we, JOHN W. GARDNER, of Cleveland, Ohio, and THOMAS W. RANSON, of Black River, Ohio, have invented a new and useful Improvement in Coupling-Valves for Steam or Air Car-Brakes, of which the following is a full, clear, and exact description.

In car-brakes which are worked either by air or steam it is well known that communication is made throughout the train for the passage of these elements in the following manner: A common gas-pipe, usually three-fourths of an inch in diameter, is placed underneath each car. Upon both ends of this pipe are secured short pieces of flexible tubing, provided on their outer ends with barrels or coupling-joints, bored and turned to a uniform size, and joined together by sliding one barrel into the other. The male barrel is turned to a conical or taper form, and a groove is cut upon the taper for the insertion of rubber or other elastic packing material, so as to form an air-tight joint when the barrels are united. The female barrel is also nicely turned, so that on an insertion of the male barrel the tapering portion rests against a conical seat within the female barrel. Held by an adjustable clamping-ring are hook-shaped springs upon the outside of both barrels, so that when they are shoved together these springs will catch over collars near the outer end of either barrel; and it is intended that they shall be held sufficiently strong in place that they will not be disunited by the jolting motion of the cars, or be blown apart by the passage of the air or steam current, but still be held so loosely together that the coupling-joints of this flexible pipe may separate without breaking if a car should become uncoupled and jump the track. Within this coupling-joint are also two valves, so arranged that when the barrels are united they will strike against each other and be forced back from their seats; and behind each valve is a spring which instantly seats it upon a separation of the coupling-joint. It follows that, when a train has been made up and the coupling-joints of the flexible pipe united, there is an air or steam communication from the locomotive to the rear car, and that, in cases of disaster, if the brakes should be set previous to the rupture of the coupling-joints, the brakes would still be held onto the wheels, because on the separation of the coupling-joints the valve-springs would expand and immediately close the valves upon their seats.

In practice, the coupling-valve above described is objected to, because the force of the current often blows the joints apart, and because double the number of couplings required must be used, or else it becomes necessary to turn the cars around in order to unite the coupling-joints, because the male and female joints each belong to tubing upon different cars.

Our invention therefore is designed to obviate these objections. It consists in what we term a "butt-coupling," or a coupling so constructed that the two shells or barrels do not enter one within the other in order to make an air-tight joint, but each shell has a face precisely like the other, so that any two will couple together, obviating the necessity of any turning around of the cars.

It further consists in a valve and sliding valve seat or sleeve so combined with the shells that the greater the pressure of the current the tighter the coupling-joints will hold together, because the surface of the sleeves at their ends nearest the coiled springs is so large that they receive the reactionary or back pressure of the current, which causes the two sleeves to press the elastic packing upon their outer ends into a perfect air-tight joint. The results accomplished by our invention, therefore, are that our coupling-valve cannot be blown apart by the current, and that it can be united without certain ends of the cars being toward each other, simply because both ends of the shells are alike and butt together, instead of sliding one within the other.

Figure 2:
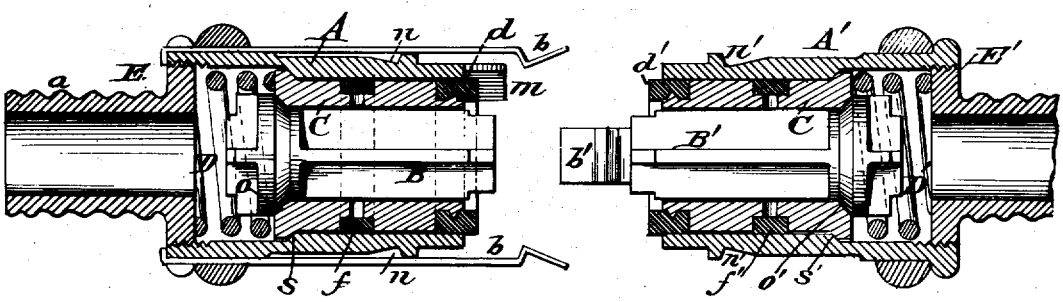
Figure 3:
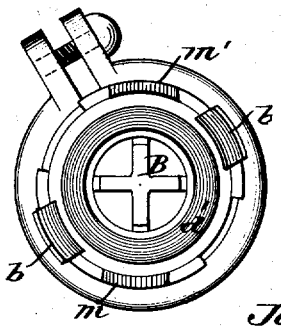

Referring to the drawing, Figure 1 shows a side view of the coupling-valve united; Fig. 2, a longitudinal section, showing the coupling separated; and Fig. 3, an end view of the same.

A A′ represent the shells or barrels of the butt-coupling valve, and *a* the projection onto which is screwed the flexible pipe or tubing which extends between the cars, the coupling-valve, when united, being midway between them. When the barrels are butted together they are held united by means of guide-plates *m m'*, which also greatly serve to prevent them being blown apart, and by the hooked springs *b b'*, which catch over collars *n n'*, arranged near the outer ends of both the barrels.

Arranged within either barrel is a sliding valve-seat, C C', recessed in its center for the insertion of the packing material *f f'*, and provided with one or more holes, so that a passage of the current through the valve will expand the packing against the outer shell in order to increase the tightness of the joint. It will also be seen that the heads of the valve-seats *s s'* and of the valves *o o'*, and also that part of the shell against which the valve seats or sleeves C C' rest, are turned into a conical or tapering form, so that they will all fit tighter and tighter the more the pressure of the current is increased.

These valve-seats occupy about one-half the space of the inner diameter of the two shells, being made to present to each other as great a surface as possible when they are brought into air-tight connection with each other by the union of the shells. The larger the extent of this surface the greater will be the resisting power of the coupling against forcible separation.

Elastic packing-rings *d d'* are secured upon collars immediately at the end of the sliding valves or sleeves. The use of the packing-rings *f f'* is optional; but the use of the packing-rings *d d'* is imperative, in order to make a perfectly air-tight joint when the coupling-joints are adjusted.

Between the heads of the sliding valves or sleeves and the back plates E E' of the shells are inserted coiled springs D D', the purpose or which is to keep the sleeves C C' pressed together when the shells are united until the pressure is applied, and also for the additional purpose of forcing them back upon their seats when the shells are uncoupled.

The sliding valve seats or sleeves are bored through their entire length—a cylindrical opening of sufficient size to permit the insertion and free play of the sliding winged valves B B'. These valves project a little way beyond either the sliding sleeves or the outer shells, so that in joining the latter the winged valves will strike against each other and be unseated before the sleeves come into contact, and are forced back from their rests within the shells A A' far enough to permit the springs *b b'* to clasp over their respective collars.

The sliding sleeves and coiled springs are only employed to secure a perfectly air-tight joint; but the sliding winged valve within is made to play loosely, so that, in case of disaster, if the engineer should set the brakes previously to the wrecking of the train and the piling of one car upon another, or the throwing of the cars down an embankment, and also previously to the forcible separation of the coupling-valve, the rupture of the latter would then permit the steam or compressed air—which, on a separation of the barrels, would have of course an outward pressure, or a tendency to escape into the natural atmosphere—to seat the valves B B' instantly, thus preventing any escape of the current, but keeping it confined, so that the brakes will be held to the wheels.

Even if there is no fluid-pressure in the pipes when they are uncoupled, the connecting ends, being attached to flexible tubes, will drop down vertically, and the valves B B' will consequently automatically fall by their own weight into their seats, and so keep the pipes closed against the admission of dust.

What we claim as new, and desire to secure by Letters Patent, is—

1. The combination of the sliding sleeve C, provided with packing-ring *d*, with a spring, D, shell A, and valve B, substantially as herein shown and described.

2. A butt-coupling consisting of the shells A A', provided with sliding sleeves C C' and valves B B', constructed substantially as herein shown and described.

3. A butt-coupling consisting of two shells with contiguous faces alike, each having in it a valve which will be automatically opened by coupling said shells together and will be automatically closed by uncoupling, said shells having in their contiguous faces elastic packing-rings, which will coincide and come in contact when the shells are coupled, and will be pressed against each other to tighten the joint by the fluid-pressure in the pipes, said coupling-shells being so united as not to be separated by ordinary fluid-pressure within the pipes, and yet to separate without breakage when subjected to an unusual external strain.

In witness whereof we hereto subscribe our names in the presence of two attesting witnesses.

JOHN W. GARDNER.
THOMAS W. RANSON.

Witnesses:
JOHN COON,
GEO. W. COON.